Jan. 6, 1959 T. BARDEEN 2,867,490
SEQUENCE INDICATOR FOR OSCILLOGRAMS
Filed Sept. 29, 1955

INVENTOR.
Thomas Bardeen.
BY
ATTORNEY:-

United States Patent Office 2,867,490
Patented Jan. 6, 1959

2,867,490

SEQUENCE INDICATOR FOR OSCILLOGRAMS

Thomas Bardeen, Fox Chapel, Pa., assignor to Gulf Research & Development Company, Pittsburgh, Pa., a corporation of Delaware Application September 29, 1955, Serial No. 537,438

4 Claims. (Cl. 346—49)

This invention pertains to an apparatus for automatically indicating a sequence in which oscillographic recordings are made and in particular concerns an apparatus for automatically indicating the sequence in which seismograph prospecting recordings are made.

In geophysical seismograph prospecting it is customary to place geophones and explosive charges along a profile line. Detonation of the explosive produces earth tremors that are picked up by the geophones. The geophones are connected to amplifiers in a recording truck and the amplified impulses are recorded by means of oscillograph galvanometers on a moving tape for subsequent examination and analysis. In normal operations of this type on land the operator of the recording instrument has ample time to mark the record during the time interval in which the geophones are moved to a new location. The mark usually comprises the shot number and direction or other identifying characteristics and is commonly applied manually with indelible pencil. Alternatively the recorder may be equipped with a photographic or other numbering device which is connected to the record-driving motor so as to apply a serial number to each record.

In the course of geophysical seismograph operations in areas covered by water of substantial depth it is now common practice to tow a streamer behind a recording boat, the streamer comprising the geophones which pick up the seismic tremors from the water. In this type of operation the boat is generally not stopped (although the streamer may momentarily be slowed down) and recordings are taken at very frequent intervals i. e. of the order of every two minutes. This means that in the course of a day a very large number of records are accumulated and the operator does not have sufficient time between shots to manually mark each record. Serial numbering devices have also been found to have serious limitations, particularly in that they require considerable power for solenoid and light-source operation and that the mark is lost if either of these should fail. Furthermore, it is difficult to synchronize a single number mark with the firing so that the mark will occur on a useable part of the record.

The apparatus of this invention comprises an electric oscillator, preferably of the transistor type together with an automatic stepping switch which on successive recordings switches the oscillator output to a different one of the recording galvanometers in a definite order of sequence so that the sequence of the recordings becomes a positive part of the recorded oscillogram itself.

It is accordingly an object of this invention to provide apparatus for indicating the sequence in which oscillograph recordings are made.

It is a further object of this invention to provide apparatus by which an identifying signal is applied to a different galvanometer of successive recordings in known sequence so that the sequence of the recording may be subsequently definitely ascertained.

It is a further object of this invention to provide apparatus which places an identifiable mark on successive traces of successive oscillograms only during the initial part of the recording and automatically turns off the identifying signal prior to the recording of the desired signals.

These and other useful objects of the invention are accomplished as described in this specification of which the drawings form a part, and in which—

Figures 1, 2:
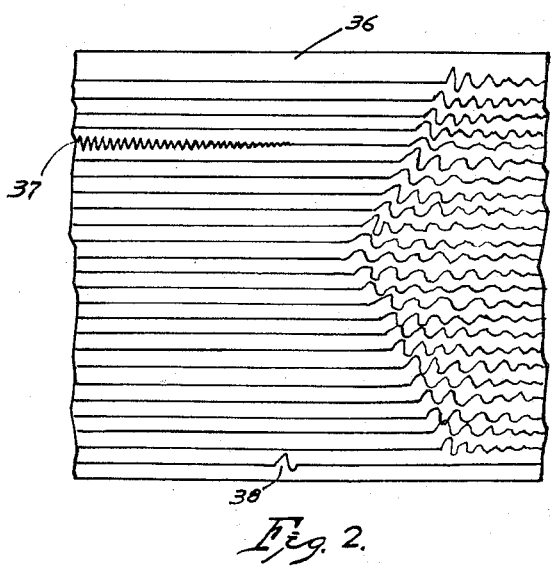
Figure 1 shows a wiring diagram of the circuit employed in this invention.
Figure 2 illustrates a sample of a portion of a geophysical seismograph prospecting record made with a recorder employing this invention.

This invention comprises a transistor-type oscillator together with an automatic stepping switch so arranged that the stepping switch applies the oscillator output to a different one of the recording galvanometers each time the recorder motor has been energized. Furthermore, energization of the recorder motor also automatically cuts off the oscillator after a short time interval so that its signal appears only on the early part of the record and does not interfere with the galvanometer's recording of the subsequent seismic events.

Referring to Figure 1 the apparatus comprises a well-known Colpitts type of oscillator whose circuit is shown inside the dotted block 10. The oscillator comprises transistor 11 which may be an npn-type transistor such for example as type TI-201, made by Texas Instruments Inc. The emitter (E) is connected through resistor 12 to ground. The base terminal (B) is connected to a six-volt D.-C. supply through resistor 13 and is also connected to ground through condenser 14. The collector terminal (C) is connected to the six-volt supply through inductance 15, and is also connected to the emitter through condenser 16. A condenser 17 connects from the terminal 18 to ground connection 19 through a stepping switch 20 which connects one of the recording galvanometers 21 into the circuit between the stepping switch 20 and ground point 19. A typical galvanometer impedance of about 18 ohms would normally appear between switch 20 and ground 19.

By way of example, the valves which may be used for the circuit components are as follows:

Condenser 14_____ 2 mfd.
Condenser 16_____ 0.35 mfd.
Condenser 17_____ 1.0 mfd.
Inductance 15_____ 1 henry (toroid).
Resistor 13_____ 0.1 begohm.
Resistor 12_____ 15,000 ohms.
Transistor 11_____ npn transistor type TI-201.
Condenser 30_____ 100 mfd.
Resistor 29_____ 12–37,000 ohms.
Rectifier 32_____ 1N81 diode.
Galvanometer 21_____ 18 ohms.
Resistor 35_____ 18 ohms.

The above-described oscillator circuit will oscillate at a convenient frequency of about 300 C. P. S., and use only about 200 microamperes D.-C. from the six-volt supply. Due to the low current requirement this oscillator may be left on at all times if desired, except as will be explained later. The tank circuit consists of inductance 15 and condensers 16 and 17 in series. The galvanometer 21 connected between switch 20 and ground 19 indicates tank current. The condensers 16 and 17 form a voltage divider which controls feedback.

The recorder is shown only diagrammatically by elements 21, 24, 25, 26 and 27. Light from a galvanometer lamp 24 may be reflected from the galvanometer mirror onto a moving photographic record film 25. Motion of the film is effected by record-drive motor 26. The record-drive motor 26 has one side grounded and the other terminal is connected to a source of electric power through normally-open switch 27. The record-drive motor 26 is preferably driven from a 12 volt D.-C. source as indicated in Figure 1, but any D.-C. source of higher voltage than that which supplies the oscillator 10 or an A.-C. source may be used. A recording is made by closing the record-motion control switch 27 and this switch may also serve to energize the lamp 24 and/or other accessories as is customary in recorders of this type.

The recorder is shown diagrammatically with but one galvanometer 21. However, it is customary in seismograph recorders to record a number of channels and it is common for recorders of this type to accommodate twenty-five or more galvanometers all of which are similar to 21 and all of which record on the moving tape 25. Galvanometer 21 is shown connected to the fifth step of stepping switch 20 and each of the other steps (with the possible exception of one such as number twenty-five which may be blank) is connected to one of the other galvanometers. The galvanometer 21 is shown also connected to terminal 23 and all of the other galvanometers have similar terminals into which the seismic impulses to be recorded are fed from the preceding apparatus of the respective seismograph channel. In addition to the seismograph channel galvanometer the recorder may have one or more galvanometers connected to indicate shot moment, up-hole impulse, timing, and other signals as is customary in the seismograph recording art.

A wire 28 connects from the motor side of switch 27 to a series circuit comprising resistor 29 and condenser 30, the other side of the circuit being connected to ground as shown. The elements 29 and 30 comprise an RC time-constant circuit and the common point 31 will develop a gradual build-up of voltage after the switch 27 is closed. The point 31 is connected to terminal 18 of the oscillator, preferably through a diode half-wave rectifier 32 connected to pass current from the point 31 to the point 18. The purpose of the diode 32 is to isolate the circuit elements 29 and 30 from the oscillator except when switch 27 is closed to run the record-drive motor 26. In the circuit shown, when the switch 27 is closed the 12-volt recorder drive source is also connected via the switch 27 through resistor 29 to condenser 30 which charges gradually. If the record-drive motor is operated on A.-C., the necessary D.-C. voltage to operate the RC circuit (29, 30) may be obtained by a transformer of suitable turn ratio and an appropriate rectifier which can deliver a voltage higher than the six-volts which operates the oscillator 10.

When the charge on condenser 30 has built up so that its potential is higher than the normal voltage on the emitter (E) of the transistor 11, rectifier 32 will become conducting and will allow current to flow from point 31 to point 18. This causes the emitter potential to become more positive, so that the emitter current is thereafter reduced toward cut-off. In addition, when the rectifier diode 32 becomes conductive, condenser 30 acts as a shunt across condenser 17 which reduces the oscillator feedback and further tends to stop the oscillation. The oscillations of the oscillator 10 are substantially unaffected until the rectifier 32 becomes conductive. However, if desired the rectifier may be omitted, in which case the oscillator output begins to diminish immediately upon closing switch 27. In a typical example using the rectifier 32 the oscillator dies out within a second or less after closure of the switch 27.

A solenoid indicated by 33 is mechanically connected to the stepping switch 20 and is electrically connected by normally-closed push button 34 and wire 28 to the motor side of the switch 27 so that the solenoid 33 is actuated each time the switch 27 is closed. The push button 34 may be replaced by a simple connection to the motor side of switch 27 if desired. The actuating mechanism (not shown) for the stepping switch 20, which may be of the rotary type such as employed in the automatic-switching art, is preferably, though not necessarily, such that energization of the solenoid 33 retracts a pawl over a ratchet wheel against a spring, and deenergization of the solenoid allows the spring to advance the ratchet wheel and switch one step. The switch has a rotary contact arm 20 which connects to one of twenty-five step contacts in succession on its semi-circular arc. As arm 20 leaves the last contact a diametrically opposite arm 20(a) enters at the first contact to start another sequence cycle. The switch thus connects each one of the galvanometers in succession into the oscillator circuit. One of the step contacts such as the twenty-fifth may be connected to a dummy resistor 35 the other side of which is connected to ground, this step serving as a blank.

Operation of this invention may now be described. With the six-volt supply connected to the oscillator and the oscillator circuit completed through one of the steps of switch 20, the oscillator will oscillate and the galvanometer connected to the step on which switch 20 is set will indicate a signal. Figure 2 shows a typical record 36 having twenty-five galvanometer traces, the first twenty-four of which are connected to seismic channels. These galvanometers are also connected to twenty-four steps of the switch 20. As shown in Figure 1 the switch 20 is resting on contact number five and in this case number five galvanometer will be excited by the oscillator. When a new recording is to be made, switch 27 is closed to start the record-drive motor 26 whereupon the record of Figure 2 is made. Closure of switch 27 also energizes solenoid 33 to cock the switch 20 into its next position. In the recording of Figure 2, the fifth galvanometer was energized as indicated by the sinusoidal trace 37. Switch 27 also energizes circuit 29 and 30, and voltage builds up on condenser 30. When voltage at point 31 exceeds that of point 18, the rectifier 32 will begin to conduct and thereafter the signal from oscillator 10 is gradually cut off and this is shown by the decaying signal in trace 37 of Figure 2. In normal seismograph operations there is a delay of a second or two between the closure of switch 27 and firing of the shot. The RC circuit 29 and 30 delays cutting off the oscillator signal but the entire circuit is arranged to cut off the signal prior to reception of the seismic impulses so that the galvanometer trace is substantially undisturbed at the time of shot moment shown on Figure 2 by the impulse 38. Upon cessation of the oscillator signal, the galvanometer may record the seismic impulses received from its channels in undisturbed manner. These seismic impulses are indicated on the right-hand portion of Figure 2. Thus the presence of the oscillation 37 on number five trace indicates the sequence of this recording in the succession of recordings made during the day. The preceding record will show the oscillation on trace number four and the succeeding record will show the oscillation on trace number six, and so on.

In order to set the stepping switch to any number at the beginning of the day a double-throw push button 34 is provided with the normally-closed contacts connected between the solenoid 33 and the wire 28 as shown. The normally-open contact of the push button is connected by wire 39 directly to the 12-volt supply. The operator may thus manually advance the stepping switch by pressing the button 34, this being convenient to set the stepping switch to any desired trace number at the beginning of each day's work.

Whereas this invention has been described as employed in geophysical seismograph operations, the invention is not limited to such use but may be used to identify successive recordings in any application of recording technique. Furthermore the galvanometers are herein indicated to be part of a seismograph recording channel but this is by way of example only, and the successive galvanometers may be connected to recording channels of any type.

Whereas the oscillator 10 has been described as a transistor-type oscillator which supplies substantially alternating current, the invention is not limited to this particular type of device. Any known type of electronic oscillator which produces a non-continuous (e. g. sawtooth, square-wave, etc.) electric signal whose amplitude is controllable by way of voltage on an electronic element may be employed. Thus for example, a vacuum-tube oscillator may be used in place of the transistor oscillator, or any type of alternating-current source whose signal is identifiable and which is provided with an amplitude-control connection may be employed. However, for marine geophysical seismograph operations the transistor oscillator shown is preferred because of its small size and low current consumption.

The stepping switch 20 advances one step for each operation of the recorder, normally shifting the identifying signal 37 from trace to trace starting at one edge of the record and successively moving to the other edge of the record, and then repeating its sequence. It is therefore a simple matter to later determine the exact recording order of a series of recordings, provided only that the records are handled in their approximate order and are not allowed to get out of order by more than a fraction of the stepping-switch sequence. However it is within the purview of this invention to extend the range of the numerations by means which will be evident to those familiar with number systems.

Whereas Figure 1 shows the oscillator signal applied directly to the galvanometer of the respective recording channels, it is contemplated that the signal may alternatively be applied to any convenient part of the channel. Thus for example, the signal across a resistor such as 35 may be applied through appropriate blocking or by-pass condensers to the amplifier of the respective channel. By channel is meant any signal path which terminates as a single trace on the record.

What I claim as my invention is:

1. In a multi-channel recording system having a plurality of separate signal channels whose signals are simultaneously separated recorded on a common recording medium whose motion is controlled by a record-motion-control switch, improved means for sequentially marking for identification successive recordings which comprises a source of non-continuous electric current, sequential switching means actuated by the record-motion-control switch and adapted to connect said source to a different channel each time record motion is initiated by the record-motion-control switch, and means actuated by the record-motion-control switch rendering said source inoperative at a predetermined time after record motion is initiated.

2. Apparatus for sequentially marking successive multi-channel recordings that are made on a recorder having a record-motion-control switch, which comprises a controllable electronic oscillator having one output terminal connected to ground and having a control terminal whose potential controls the output signal of said oscillator, switching means actuated by the record-motion-control switch and adapted to connect the output of said oscillator in known sequence to a different channel each time record motion is initiated by the record-motion-control switch, a condenser having a first terminal connected to ground, a resistor having a first terminal connected to the second terminal of said condenser and having a second terminal connected to the record-motion-control switch, the common terminal between said condenser and resistor being connected to the central terminal of said oscillator.

3. Apparatus for sequentially marking successive multi-channel recordings that are made on a recorder having a record-motion-control switch, which comprises a Colpitts oscillator having one output terminal connected to ground and including a transistor having an emitter element, a stepping switch, means for actuating said stepping switch concurrently with closure of the record-motion-control switch, means for supplying output signal from said oscillator to said stepping switch, means for connecting each of a plurality of steps of the stepping switch to a different recording channel, a condenser having a first terminal connected to ground, a resistor having a first terminal connected to the second terminal of said condenser and having a second terminal connected to the record-motion-control switch, the common terminal of said condenser and said resistor being connected to the emitter of said transistor.

4. Apparatus for sequentially marking successive multi-channel recordings that are made on a recorder having a record-motion-control switch, which comprises a Colpitts oscillator having one output terminal connected to ground and including a transistor having an emitter element, a stepping switch, means for actuating said stepping switch concurrently with closure of the record-motion-control switch, means for supplying output signal from said oscillator to said stepping switch, means for connecting each of a plurality of steps of said stepping switch to a different recording channel, a condenser having a first terminal connected to ground, a resistor having a first terminal connected to the second terminal of said condenser and having a second terminal connected to the record-motion-control switch, and a rectifier connected to pass current from the common terminal of said condenser and said resistor to the emitter of said transistor.

References Cited in the file of this patent

UNITED STATES PATENTS 2,489,253  Andre ---------------- Nov. 29, 1949
2,676,316  Wallace -------------- Apr. 20, 1954